United States Patent
Krause et al.

(10) Patent No.: US 6,914,223 B2
(45) Date of Patent: Jul. 5, 2005

(54) COOK-TOP

(75) Inventors: Cora Krause, Burrweiler (DE);
Monica Cotlear De Witzmann,
Nieder-Olm (DE); Daniela Petto,
Mainz (DE); Bernd Schultheis,
Schwabenheim (DE); Claudia Booss,
Erbes-Buedesheim (DE); Ella Saar,
Mainz-Mombach (DE)

(73) Assignee: Schott Glas, Mainz (DE)

( * ) Notice: Subject to any disclaimer, the term of this patent is extended or adjusted under 35 U.S.C. 154(b) by 17 days.

(21) Appl. No.: 10/220,676

(22) PCT Filed: Feb. 15, 2001

(86) PCT No.: PCT/EP01/01678

§ 371 (c)(1),
(2), (4) Date: Sep. 4, 2002

(87) PCT Pub. No.: WO01/72087

PCT Pub. Date: Sep. 27, 2001

(65) Prior Publication Data

US 2003/0019864 A1 Jan. 30, 2003

(30) Foreign Application Priority Data

Mar. 23, 2000 (DE) .......................... 100 14 373

(51) Int. Cl.⁷ ................................................ H05B 3/68
(52) U.S. Cl. .................................. 219/460.1; 219/465.1
(58) Field of Search ......................... 219/460.1, 461.1, 219/462.1, 465.1, 466.1, 467.1, 468.1, 469.2; 428/426, 428, 429, 210; 429/258, 266, 269; 126/39 H, 39 N, 39 J

(56) References Cited

U.S. PATENT DOCUMENTS 3,266,912 A * 8/1966 Murphy ..................... 65/33.4
3,773,543 A * 11/1973 Wartenberg ................. 427/224
4,057,670 A * 11/1977 Scheidler .................... 428/189
5,183,997 A * 2/1993 Lotz ........................ 219/460.1
5,212,122 A * 5/1993 Pannhorst et al. ............ 501/69
5,716,712 A * 2/1998 Schonig et al. ............. 428/428
5,723,220 A * 3/1998 Leroux et al. .............. 428/426
5,866,239 A * 2/1999 Shimatani et al. .......... 428/210

FOREIGN PATENT DOCUMENTS

| DE | 35 05 922 C1 | 10/1986 |
| DE | 34 33 880 C2 | 3/1987 |
| DE | 36 00 109 C2 | 1/1988 |
| DE | 44 26 234 C1 | 3/1996 |
| DE | 197 28 881 C1 | 9/1998 |
| DE | 299 02 875 U | 8/1999 |
| EP | 0 220 333 B1 | 3/1990 |
| EP | 0 716 270 A | 6/1996 |
| JP | 51-89517 | 8/1976 |
| JP | H7-17409 | 3/1991 |

* cited by examiner

Primary Examiner—Sang Y. Paik
(74) Attorney, Agent, or Firm—Michael J. Striker

(57) ABSTRACT

The cook top is divided into at least one cold zone and cooking zones heatable by radiant heating elements under the cooking zones. The cook top includes a transparent, colorless glass ceramic or glass plate and a non-ceramic underside layer or layers on the underside of the plate. The upper side of the glass ceramic or glass plate is free of any decoration or layer, thus providing a cooking surface having improved smoothness for easy cleaning. The non-ceramic underside layer is permeable to infrared radiation in the cooking zones and is a color-imparting decoration. The underside layer, at least in cooking zones, has transmission properties for visible light such that the radiant heating elements are not visible from above, at least when they are not in a switched-on state.

18 Claims, 2 Drawing Sheets

COOK-TOP

Figure 1:
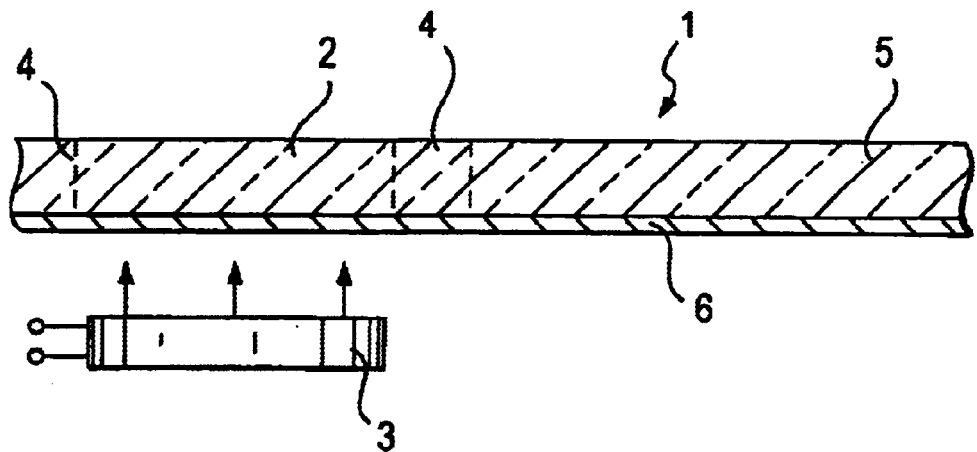

The invention relates to a cook-top having a transparent, untinted glass ceramic plate or alternatively having a glass plate of prestressed special glass as the cooking surface, which has cooking zones heated with radiant heating elements, to which zones decorations are applied and whose underside has an IR-permeable layer of a temperature-resistant coating.

Cook-tops with a glass ceramic plate as the cooking surface are now the state of the art. Typically, as disclosed in European Patent Disclosure EP 0 220 333, they have a glass ceramic plate which is tinted with color-imparting ions to reduce transmissions, so that the functional components of the cook-top accommodated underneath the glass ceramic plate are practically invisible from above. These cooking surfaces are therefore practically nontransparent and look black when viewed from the top.

Generally, cooking surfaces formed of the aforementioned glass ceramic plates are provided with decorations, either for purely esthetic reasons or in order to demarcate functional regions, such as the cooking zones, from other regions of the cooking surface. These decorations and their application to the glass ceramic plate are described for instance in German Patents DE 44 26 234 C1 (=EP 0 693 464 B1) and DE 34 33 880 C2.

Because of the nontransparency of the tinted glass ceramic plate, the decorations on the cooking surface, including the so-called full-surface-decorated cooking surfaces known from German Patent DE 197 28 881 C1 (=DE 297 11 916.8 U1), in which the decoration covers virtually the entire surface of the cooking surface, in the aforementioned prior art are either typically printed by screen-printing or applied by the decal technique and then fired, on the surface using ceramic enamel-based coatings.

A disadvantage of these known cook-tops with decorated glass ceramic plates is that the ceramic decoration coatings can be applied only in a relatively thin layer of only a few micrometers, and at that layer thickness lack the desired brilliance. Moreover, because of problems dictated by printing technology, especially with the full-surface-decorated cooking surfaces, the design of the decorations and thus the appearance of the cooking surfaces is not free of restriction. Moreover, only certain decorating coatings that meet the needs of the industry (because pans slide over them, spilled and burned food must be cleaned off, etc.) can be used, since the decorations applied to the top side are exposed to severe mechanical and chemical attacks, as described for instance in German Patent DE 36 00 105 C2.

Moreover, the decorations applied to the top side of the glass ceramic plate are a hindrance to achieving the smoothest possible cooking surface.

So-called glass hoptops are also known, in which plates of prestressed soda-lime glass are provided, which are decorated on the underside with organic coatings, and which have bores for receiving atmospheric gas burners. The organic coatings have a relatively low temperature resistance, which in the case of glass hoptops is sufficient, since they are set into cold regions. In cooking surfaces with glass ceramic plates and radiant-heated cooking zones, however, the temperatures are much higher, and so the known technique cannot be employed in this respect.

Induction-heated cooking surfaces with transparent glass ceramic plates are also known, which because of the low temperatures that occur there have merely an organic decorated underside coating that assures nontransparency, but they are undecorated in the region of the cooking zones.

From Japanese Patent Disclosures JP 7-17409 and JP 51-89517, it is known for glass ceramic plates serving as cooking surfaces to be produced from a transparent, untinted glass ceramic, and to imprint the underside of these plates with a temperature-resistant coating. This coating layer, however, serves solely to provide nontransparency; it merely replaces the otherwise usual tinting, so that in plan view once again they appear black. The decorations in this known case are likewise applied to the top side, with the corresponding disadvantages described at the outset.

The object of the invention, in cooking surfaces formed of glass ceramic plates or glass plates of prestressed special glass, is to enhance the brilliance of the decorations and to achieve the smoothest possible cooking surface.

On the basis of a cook-top having a transparent, untinted glass ceramic plate or glass plate of prestressed special glass as the cooking surface, which has cooking zones heated with radiant heating elements, to which zones decorations are applied and whose underside has an IR-permeable layer of a temperature-resistant coating, this object is attained according to the invention in that the layer on the underside is embodied as a color-imparting decoration, and the upper side of the glass ceramic plate or glass plate is free of decoration. Viewed from the top, the decorations embodied according to the invention have very high brilliance, comparable to stained glass. Since the decorations are applied to the underside of the glass plate or glass ceramic plate, the top side of the plate that forms the cooking surface is therefore quite smooth and therefore much easier to clean and use. The choice of coatings is moreover no longer limited by mechanical requirements and cleaning needs, since the underside of the glass plate or glass ceramic plate is not exposed to scratching from sliding cookware or to cleaning agents or spilled food. With this freedom from the necessities of the cooking surface, novel design options are also opened up.

In one feature of the invention, the temperature-resistant coatings are printed on and fired. Compared to other methods of coating application, this printing method makes simple and hence economical production of the glass plate or glass ceramic plate provided with decorations possible; in the case of glass ceramic plates, the typical bumpy structure makes coating application more difficult.

As temperature-resistant coatings, in the refinement of the invention, coatings can be considered that are based on metal compounds and/or noble metal compounds dissolved in organic solvents and/or that contain colloidal metals, so-called lustrous coatings, noble metal resinates, or in general "organometallic" coatings, as well as organometallic coatings that can additionally be arbitrarily pigmented, as well as coatings with a sol-gel-based matrix which either have a characteristic intrinsic color and/or can additionally be pigmented arbitrarily; in the hot zone, conventional inorganic pigments or lustrous, pearl-gloss interference pigments or arbitrary mixtures of these pigments can preferably be used.

For the cold zone, once again the aforementioned organometallic coatings, lustrous coatings, noble metal resinates, and/or additionally arbitrarily pigmented organometallic coatings, lustrous coatings, and noble metal resinates can be considered, and/or organic coatings, colored paints, coatings based on organically modified glasses, and/or coatings that comprise an organic binder matrix or a sol-gel-based matrix, and contain organic dyes or inorganic pigments, lustrous pigments, metal-effect pigments, pearl-gloss pigments or interference pigments, or various mixtures of these pigments. The "organometallic" coatings and coatings based on a sol-gel matrix that are named first have the requisite temperature resistance for permanently withstanding even direct exposure to the radiant heating elements that heat the cooking zones.

The aforementioned coatings are fired at different temperatures, depending on the color type.

The otherwise usual ceramic coatings cannot be used in glass ceramic plates coated on the underside, since firing would reduce the mechanical strength of the glass ceramic plate considerably, so that surge loads of the kind that occur in practice would for instance cause damage to the glass ceramic plate.

In one feature of the invention, to achieve particular color effects, in some cases, decorations formed as coatings comprising the aforementioned organometallic solutions with metal and/or noble metal components, which as a rule have sufficient coverage, are backed with organic coatings or coatings that comprise an organic, preferably polymer binder matrix or a sol-gel-based matrix and contain conventional inorganic pigments, lustrous pigments, metal-effect pigments, pearl-gloss pigments or interference pigments, or various mixtures of these pigments.

Depending on the requisite temperature dependency, that is, on whether the decorations are applied in the heated zone or in the cold zone of the cooking surface, in a further refinement of the invention combinations of various coatings are used. This is because in principle, any of the aforementioned coatings can be used individually or—if compatibility exists—in combination with any other of the aforementioned coatings; the temperature resistance of the individual coating types, the degree of transparency of the colored layers, and the desired color impressions affect the range of use and the coating combinations.

The coatings formed of organometallic solutions with metal and/or noble metal components can also themselves, to create novel effects, be mixed with conventional inorganic pigments, lustrous pigments, metal-effect pigments, pearl-gloss or interference pigments, or various mixtures of these pigments and printed on the back as needed with organic coatings, colored paints, paints based on organically modified glasses, and/or coatings that comprise an organic, preferably polymer binder matrix or a sol-gel-based matrix and are arbitrarily pigmented.

In addition, combinations of transparent lustrous coatings with noble metal coating as an underprinting are conceivable, especially in the cold zone.

Depending on the requisite temperature resistance, that is, whether the heated zone or the cold zone of the cooking surface is involved, either only the aforementioned "organometallic" coatings are used, or a combination of these coatings with an organic coating, a colored paint, a coating based on organically modified glasses, or with coatings that comprise an organic, preferably polymer binder matrix or a sol-gel-based matrix and contain conventional inorganic pigments, lustrous, metal-effect, pearl-gloss or interference pigments, or various mixtures of these pigments, are used.

In a refinement of the invention, decorations are applied in multiple layers by multiple printing. As a result, depending on the number of printed layers in repeated printing, the degree of transmission can advantageously be adjusted; as a result, it is possible in particular for there to be special functional regions, such as display windows, on the cooking surface. Also in this way, metallic effects can be attained, which especially in view of the possible combinations with special steel are wanted by customers.

In another refinement of the invention, the cook-top is embodied such that in the cold zone of the glass plate or glass ceramic plate, a laminated foil or film, such as a thin aluminum foil or a temperature-resistant polyester or melamine resin film, is applied with highly transparent adhesives, while only in the cooking zones or hot zones is a colored layer of the temperature-resistant coatings applied, in particular a single- or multi-layer noble metal and/or lustrous coating layer; the latter is preferred because of its higher IR transparency. Over the laminated foil or film, decorations can then be applied.

In a further feature of the invention, in the region of the cooking zones, dark, concealing coatings are applied, so that only when the heating elements are switched on can they be seen, so that when the cook-top is switched off they accordingly cannot adversely affect its appearance.

Further features of the invention will become apparent from the description of two embodiments, which are shown in the drawings and also explain the invention in further detail.

Figure 2:
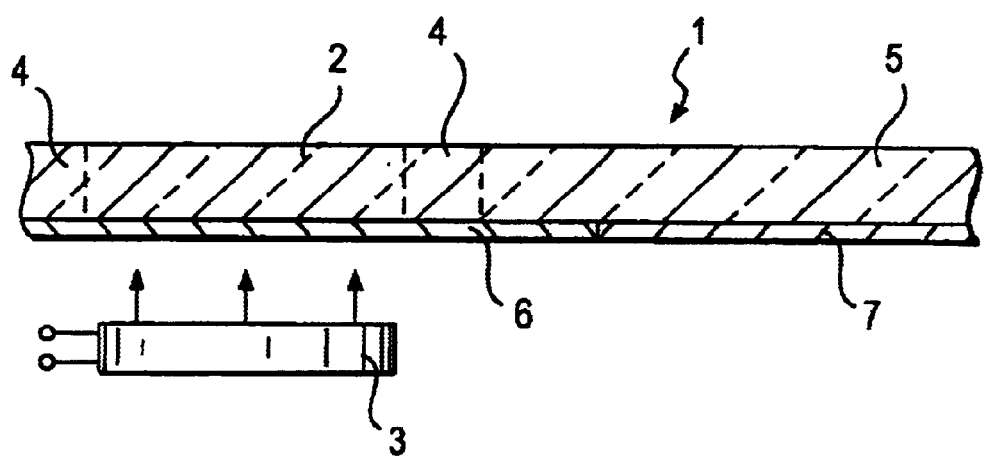
Figure 3A:
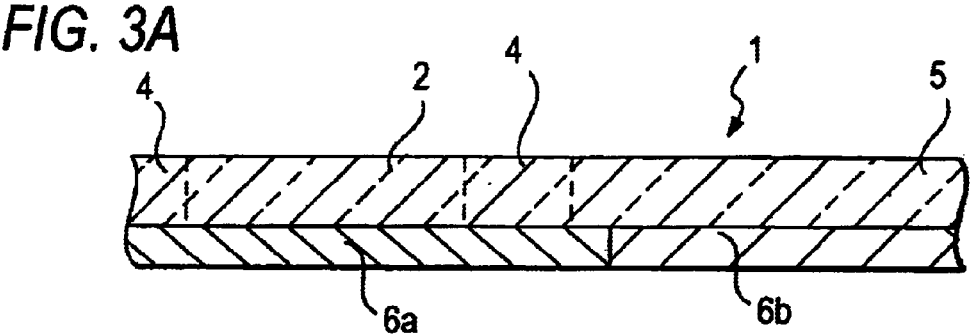
Figure 3B:
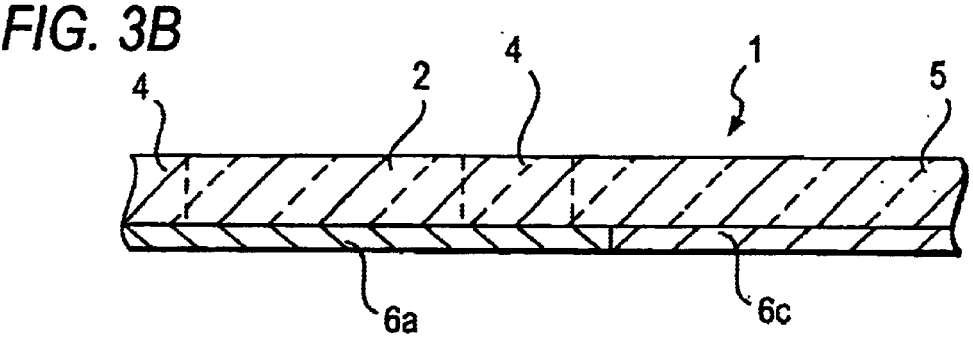
Figure 3C:
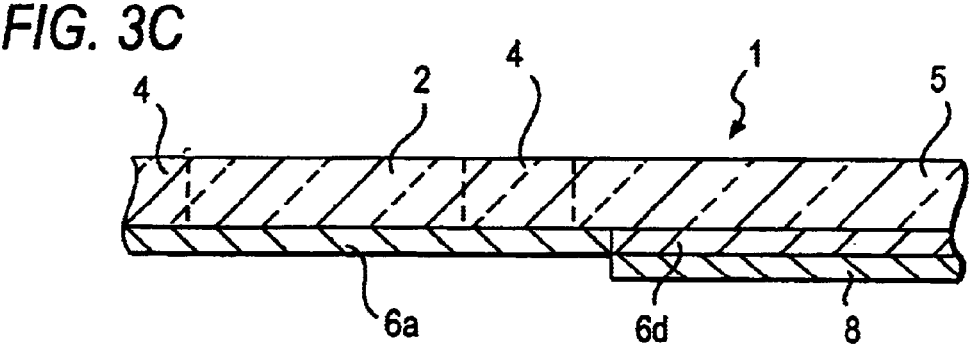
Figure 3D:
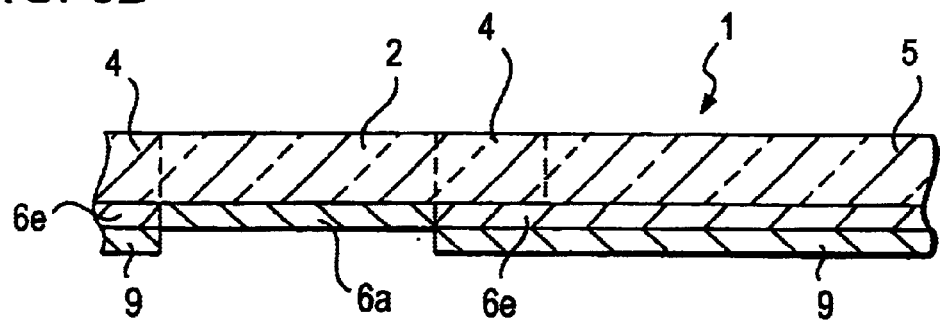

Shown Are:

FIG. 1, in a schematic sectional view, a detail of a cook-top with a transparent, untinted glass ceramic plate, which on its underside has coatings of temperature-resistant, nonceramic coatings for creating decorations and/or characters; and FIG. 2, in a schematic sectional view analogous to FIG. 1, a corresponding glass ceramic plate which has the colored layers only in the cooking zones and a transition zone, and to which a thin aluminum foil is adhesively bonded in the cold zone; and FIG. 3, in four portions A–D, various combinations of colored layers.

FIG. 1, in a schematic sectional view, shows a detail of a cook-top with a transparent, untinted glass ceramic plate 1 as the cooking surface.

This glass ceramic plate 1 has at least one cooking zone 2 or hot zone, represented by dashed lines, with which an electrically operated radiant heating element 3 is associated. The hot zone 2 typically has a temperature of over approximately 350° C. It is surrounded by an annular transition zone 4, represented by dashed lines, with a thickness of 0–25 mm and by the cold zone 5, where the temperature is as a rule below 220° C.

According to the invention decorations of temperature-resistant coatings are applied to the underside of the transparent glass ceramic plate 1, as represented initially in summary form and symbolically in FIG. 1 by the layer 6; examples of it are given in the various portions of FIG. 3. This layer 6, which can also be in multi-layers, comprises the above-described coatings and coating combinations, which have a high temperature resistance adapted to the region of the plate to which they are applied, and their application to the underside of the plate is done by printing.

The above-described coatings formed of organometallic solutions with metal and/or noble metal are film-forming coatings, which contain one or more noble metals—in particular, platinum, palladium, gold and silver—as well as other metal compounds, dissolved in organic solvents, and/ or contain metals in colloidal form, and to which substances such as resins, cosolvents, and/or arbitrary additives are added that affect the color, the color intensity, or the adhesion or solubility of the lustrous coatings. Manufacturers of such coatings include Heraeus, Johnson Matthey, and Cerdec. These coatings are distinguished by high color intensity at even a slight layer thickness and thus lessen the strength of the cooking surfaces only slightly. The temperature resistance, depending on the coating, is between 500 and 950° C. in continuous operation, and with more-temperature-resistant coatings can briefly be up to 1000° C.

Preferably, in the heated region of the cooking surface, that is, the cooking zone 2, darker, more-concealing coatings of this type that are resistant to high temperatures are used, which allow the heating elements to be visible only in the switched-on state. By printing twice or more, the transmission in the visible spectral range can be reduced further. With single printing—depending on the type of glass ceramic and on the printing screen used—the infrared transmission is typically between 60 and 85%, which contributes to heat transfer during cooking, especially when low-quality cookware is used. This effect is reinforced by the fact that the material comprising the glass ceramic plate 1 itself already has very high IR transparency. The firing is done either in primary firing, during so-called ceramicizing, as described in German Patent DE 35 05 922 C1, or in a special secondary firing, typically at 200° C. to 900° C., and preferably at approximately 460 to 650° C. for less-temperature-resistant coatings, for about 5 to 60 minutes, or at 460° C. to 900° C. for more-temperature-resistant coatings, again for about 5 to 60 minutes. The above-mentioned "organometallic" coatings can also be used in the transition zone 4 and in the cold zone 5 of the cooking surface, that is, outside the cooking zone 2, where the temperature stress drops from about 350° C. at the edge of the cooking zone to approximately room temperature at the outer edge of the cooking surface.

Here, "organometallic" and in particular lustrous coatings that have a lesser temperature resistance are used above all, and in them, a broader color spectrum is available—for instance, including gold, red, green, tepid, various gray tones, and so forth.

For the sake of distinguishing among colors, in the preferred embodiment, a different, for instance lighter "organometallic" coating is used, which is optionally printed on the back with a cover layer. The cover layer is an organic coating, in one case. In this coating type, the temperature resistance is typically at most 180 to 300° C. As a result, between the cooking zone and the organic cover layer, an interstice approximately 0–25 mm thick must be recessed out; it is used in conjunction with the typically light-colored insulation ring of the heating elements 3 as an additional design element to identify the cooking zone, or in other words as a cooking zone marking, and it can either be unprinted or be printed with a more-temperature-resistant coating.

If coatings that contain inorganic pigments, lustrous, pearl-gloss, metal-effect or interference pigments or mixtures of various pigments are used that are distinguished by a metallic gloss, it is possible, because of the markedly high temperature resistance of approximately 500 to 650° C., compared to purely organic coatings, to dispense with the aforementioned recessing.

The aforementioned coatings can be used in the cold zone both in conjunction with the "organometallic" coatings and by themselves.

Depending on the cover coating used, different color effects are achieved in conjunction with the various "organometallic" coatings.

Further options of color design are obtained by adding so-called effect pigments. Effect pigments are lustrous, pearl-gloss or interference pigments, which in contrast to conventional pigments have layers with different indexes of refraction and thus do not absorb and scatter light but rather, depending on the layer makeup, more or less markedly reflect and transmit light, as well as metal-effect pigments, such as aluminum flakes, that act like a mirror to reflect the light in an oriented way. Manufacturers include E. Merck, Darmstadt, and BASF, Ludwigshafen—both in Germany—and Mearl Corp., New York, USA; Karrira OY, Porl, Finland; and Tayca, Osaka, Japan.

It has been found that by adding from 0 to 20 weight % of effect pigments—even in otherwise relatively dark—lustrous coatings, the metallic effect can be enhanced markedly. On the other hand, an excessively high proportion of effect pigments (over 20 weight %) worsens the adhesion properties, so that the preferred range is between 0.1 and 10%.

A special steel effect is achieved in a preferred embodiment by using a silver-colored cover layer in conjunction with a medium-gray lustrous coating. Because of the typically slightly brownish-yellow intrinsic coloring of the glass ceramic plate, this color combination gives a color impression similar to smoked glass.

Other design options arise from the use of colorful organic coatings in the cold zone. Depending on the covering power of the coatings, an additional cover layer may be necessary.

As the glass ceramic plates, both those with a bumpy structure on the back side and plates that are smooth on both sides are used. The first type generally have greater mechanical strength. Plates that are smooth on both sides, however, have the advantage that display elements, such as LED-LCD displays, are easily readable without additional immersion layers.

In the region of functional zones, such as display windows, the transparency can be adjusted in a targeted way by means of the number of layers.

If virtually color-neutral lustrous coatings, such as anthracite, are used, then variously-colored displays can also be achieved, which is difficult for tinted glass ceramic cooking surfaces because in those cases only red color tones are possible.

In the four portions A–D of FIG. 3, various options for combining color layers in the various temperature regions of the glass ceramic plate 1 are shown. Shown are:

Portion A, a combination of a layer 6a, of a temperature-resistant lustrous coating in the hot zone 2, with a layer 6b of a different lustrous coating, which can also have a lesser temperature resistance, in the cold zone 5.

Portion B, a combination of a layer 6a of a temperature-resistant lustrous coating in the hot zone 2 with a layer 6c, which is formed by a coating with effect pigments that is temperature-resistant up to at least 350° C., in the cold zone 5.

Portion C, a combination of a layer 6a, of a temperature-resistant lustrous coating in the hot zone 2, with a layer 6d of a different lustrous coating, which can also be more-transparent, in the cold zone and which is partly printed on the back with an organic coating layer 8.

Portion D, a combination of a layer 6a of a temperature-resistant lustrous coating in the hot zone 2 with a layer 6e of a different temperature-resistant lustrous coating in the transition zone 4 and in the cold zone 5, and which is partly printed on the back with a coating layer 9 that for instance contains metal-effect pigments.

In FIG. 2, a further embodiment is shown, with a laminated foil or film, such as an aluminum foil 7, instead of a coating layer in the cold zone 5. The aluminum foil is glued with transparent, temperature-resistant adhesives to the underside of the glass ceramic plate 1. As the adhesives, the following can for instance be used: acrylate adhesive films, for instance produced by 3M; UV-curing adhesives; or high-transparency silicone adhesives, preferably 2K systems. In the lamination, care must be taken to provide bubble-free application. The adhesive films must compensate if necessary for the bumpy structure (typically from 50 to 150 µm high), resulting in a minimum layer thickness of 150 µm. In the choice of adhesives, care must be taken to provide an adequately high resistance to water vapor, since during heating, water vapor is emitted from the insulation ring of the heating elements 3. The hot zone 2 and the transition zone 4 are, as in FIG. 1, provided with the coating layer 6.

Regardless of the fact that the decorations are applied to the underside of the glass plate or glass ceramic plate 1, characters or symbols can additionally be applied to the top side of the plate.

However, preferably the requisite markings, and in particular the marking for the cooking zone, are embodied on the underside of the plate, for instance by means of gaps between decorations, or by means of differently tinted decorations bordering on one another.

Instead of a glass ceramic plate 1, the cooking surface can also be formed by a glass plate of prestressed special glass, such as lithium aluminosilicate glass (LAS glass) or borosilicate glass.

Coating Media:
  1. For the hot zone:
    a: lustrous coatings made by Heraeus, German; Johnson Matthey, Netherlands.
    b: lustrous coatings that contain conventional inorganic pigments, lustrous, metal-effect, pearl-gloss or interference pigments, or the most various mixtures of these pigments
    c: sol-gel layers or pigmented sol-gel layers that contain conventional inorganic pigments, lustrous, metal-effect, pearl-gloss or interference pigments, or the most various mixtures of these pigments
    d: noble metal coatings, noble metal resinates or other coatings that are printed with a pronounced raster for the sake of low IR transparency
  2. For the cold zone:
    At least up to 350° C., printable (without gaps), that is, directly adjacent to the hot zone
    for instance:
    a: anticorrosion coatings with metal pigments, such as aluminum flakes
    b: lustrous coatings with temperature stability up to 500° C., for instance by Heraeus, Germany; Johnson Matthey, Netherlands.
    c: lustrous coatings with temperature stability up to 500° C., which contain conventional inorganic pigments, lustrous, metal-effect, pearl-gloss or interference pigments, or the most various mixtures of these pigments
    d: noble metal coatings, noble metal resinates with temperature stability up to 900° C., for instance from Johnson Matthey, Heraeus, Germany, Cerdec
    e: sol-gel layers or pigmented sol-gel layers that contain conventional inorganic pigments, lustrous, metal-effect, pearl-gloss or interference pigments, or the most various mixtures of these pigments.
    Up to 300° C.:
    f: organic coatings with inorganic dyes, such as color paints or hydroglazes produced by Diegel in Alsfeld, Germany.
    Up to 180° C. to 220° C.:
    g: organic coatings with organic dyes, for instance by Heraeus, Germany.
    h: coatings based on organic modified glasses
    i: laminated-on foils and films, such as aluminum foils, polyester films, melamine resin films
    Furthermore, all conceivable combinations of the coating media named under headings 1 and 2 above, for instance in the cold zone, 2b+2f, 2c+2f, 2b+2a, 2b+2d, 2b+2e, and so forth.

Depending on the coating type, firing/drying/curing is done at various temperatures.

Design Elements:
  1. Examples for the Hot Zone:
    In two-ring cooking zones (small/large or round/wide grills) between the two partial surfaces of the cooking zones:
    no decoration: contrast because the heating element is highly visible in the ON state
    or a combination of lesser color contrast, for instance of a coating 1a on the surfaces with a coating 1b on the cooking zone rings:
    or a combination with greater color contrast, for instance a coating 1c on the surfaces and coatings 1a or 1b on the cooking zone rings;
    rastered coating, for instance 1d in the hot zone, optionally combined with 1a.
  2. Examples for the Cold Zone:
    transparent lustrous coatings of 1a, 1b, 2b, 2c with a silvery underprinting, producing a slightly tinted veil over a metallically concealing background
    lustrous coatings printed in flex, of the most various coloring, for instance with a white or gray background, to simulate rock structures;
    lustrous coating, for instance black, printed only on the tips of the bumps, with full-surface underprinting in a strong organic color, such as grass-green
    combination of more-concealing and transparent lustrous coatings side by side, to create viewing windows onto certain components in the cook-top system,
    printed or unprinted foil or film laminates in the cold zone.

What is claimed is:

1. A cook top consisting of a transparent, untinted glass ceramic or glass plate and a single underside layer on an underside of said plate, and said glass plate consisting of pre-stressed glass;
   wherein said glass plate or glass ceramic plate has a cooking surface on an upper side thereof, said glass plate or glass ceramic plate has a plurality of cooking zones and at least one cold zone and said cooking zones are heatable by radiant heating elements arranged under the cooking zones;
   wherein an upper side of said plate is free of any decoration or layer and said single underside layer is colored according to a desired decoration and, at least in said cooking zones, is IR-permeable; and
   wherein said single underside layer has transmission properties for visible light such that said radiant heating elements are not visible from above the glass ceramic or glass plate at least when said radiant heating elements are not in a switched-on state.

2. The cook top as defined in claim 1, wherein said single underside layer has a composition such that said single underside layer is heat resistant at temperatures greater than 350° C. in said cooking zones and is heat resistant in said at least one cold zone at temperatures up to approximately 350° C.

3. The cook top as defined in claim 1, wherein said single-underside layer, at least in said cooking zones, comprises an organometallic solution with at least one complexed metal component, colloidal metal component and/or noble metal component.

4. The cook top as defined in claim 1, wherein said single underside layer, at least in said cooking zones, comprises an organic solution of at least one noble metal compound in at least one organic solvent.

5. The cook top as defined in claim 1, wherein said single underside layer, at least in said cooking zones, comprises at least one sol-gel layer.

6. The cook top as defined in claim 2, wherein said glass ceramic or glass plate has transition zones between said cooking zones and said at least one cold zone and wherein said single underside layer in said transition zones is heat resistant at temperatures up to approximately 350° C. and comprises a lustrous or organometallic coating.

7. The cook top as defined in claim 6, wherein said lustrous or organometallic coating comprises a noble metal resinate layer, an anticorrosion coating or a sol-gel layer.

8. The cook top as defined in one of claims 3 to 7, wherein said single underside layer comprises at least one pigment.

9. The cook top as defined in claim 2, wherein said glass ceramic or glass plate has transition zones between said cooking zones and said at least one cold zone and wherein said single underside layer in said at least one cold zone and said transition zones is heat resistant at temperatures up to approximately 300° C. and comprises an organically modified glass or an organic coating containing at least one pigment in a polymer binder matrix or a sol-gel matrix, and wherein said at least one pigment is an inorganic pigment, a lustrous pigment, a metal-effect pigment, a pearl-gloss pigment or an interference pigment, or a mixture thereof.

10. The cook top as defined in claim 1, wherein said single-underside layer is backed by a cover layer (8) having a color different from said color-imparting decoration.

11. The cook top as defined in claim 1, wherein said single underside layer is provided with gaps between said cooking zones and said at least one cold zone to further mark said cooking zones.

12. The cook top as defined in claim 11, further comprising providing differently colored decorations in said gaps between said cooking zones end said at least one cold zone, said differently colored decorations having a color that is different from that of said color-imparting decoration.

13. The cook top as defined in claim 1, wherein said single underside layer is provided with display windows.

14. The cook top as defined in claim 13, further comprising residual heat indicators arranged in said display windows.

15. The cook top as defined in claim 13, further comprising colored LEDs or LCDs arranged in said display windows.

16. The cook top as defined in claim 1, wherein said color-imparting decoration comprises a printed pattern at least in said cooking zones.

17. A cook top consisting of a transparent, untinted glass ceramic or glass plate having a cooking surface on an upper side thereof, said cooking surface being divided into a plurality of cooking zones and at least one cold zone, at least one underside layer on an underside of said plate in said cooking zones and a foil on said underside of said plate in said at least one cold zone;

wherein said cooking zones are heatable by radiant heating elements arranged in said cooking zones and said glass plate consists of pre-stressed glass;

wherein an upper side of said plate is free of any decoration or layer and said at least one underside layer comprises an IR-permeable layer embodied as a color-imparting decoration;

wherein said at least one underside layer has transmission properties for visible light such that said radiant heating elements are not visible from above the glass ceramic or glass plate at least when said radiant heating elements are not in a switched-on state; and wherein said foil consists of aluminum or noble steel or is a polyester or melamine resin film laminated on the plate with transparent glue.

18. The cook top as defined in claim 17, wherein said foil has printed decorations thereon.

* * * * *